United States Patent
Kraynev et al.

(10) Patent No.: US 8,460,150 B2
(45) Date of Patent: *Jun. 11, 2013

(54) MULTI-SPEED PLANETARY TRANSMISSION WITH TWO COMPOUND PLANETARY GEAR SETS

(75) Inventors: Alexander Filippovich Kraynev, Moscow (RU); Vladimir Konstantinovich Astashev, Moscow (RU); Konstantin Borisovich Salamandra, Moscow (RU); Madhusudan Raghavan, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 203 days.

This patent is subject to a terminal disclaimer.

(21) Appl. No.: 12/954,936

(22) Filed: Nov. 29, 2010

(65) Prior Publication Data
US 2011/0207574 A1  Aug. 25, 2011

(30) Foreign Application Priority Data
Feb. 25, 2010  (RU) .................................. 2010107092

(51) Int. Cl.
*F16H 3/62* (2006.01)
(52) U.S. Cl.
USPC ........................................................ 475/275
(58) Field of Classification Search
None
See application file for complete search history.

(56) References Cited

U.S. PATENT DOCUMENTS

| 2,892,361 | A | * | 6/1959 | Miller | ........................... 475/275 |
| 3,446,092 | A | * | 5/1969 | Moan | ........................... 475/275 |
| 4,070,927 | A |   | 1/1978 | Polak |  |
| 4,709,594 | A |   | 12/1987 | Maeda |  |
| 5,106,352 | A |   | 4/1992 | Lepelletier |  |

(Continued)

FOREIGN PATENT DOCUMENTS

| JP | 09-126283 | 5/1997 |
| JP | 2006194452 A | 7/2006 |

(Continued)

OTHER PUBLICATIONS

Masami Kondo, Yoshio Hasegawa, Yoji Takanami, Kenji Arai, Masaharu Tanaka, Masafumi Kinoshita, Takeshi Ootsuki, Tetsuya Yamaguchi, Akira Fukatsu, "Toyota AA80E 8-Speed Automatic Transmission with Novel Powertrain Control System", SAE Technical Paper Series, Apr. 16-19, 2007, 2007-01-1311, Warrendale, PA 15096-0001 USA.

(Continued)

*Primary Examiner* — Dirk Wright
(74) *Attorney, Agent, or Firm* — Quinn Law Group, PLLC

(57) ABSTRACT

A multi-speed transmission includes an input member, an output member, a stationary member, and a first and a second compound planetary gear set. The first compound planetary gear set has a first, a second, a third, a fourth, and a fifth member. The second compound planetary gear set has a first, a second, a third, and a fourth member. The first member of the second compound planetary gear set is continuously connected for common rotation with the output member. An interconnecting member continuously connects the first member of the first planetary gear set for common rotation with the second member of the second planetary gear set. The transmission includes seven torque-transmitting mechanisms that are engagable to establish up to fifteen forward speed ratios between the input member and the output member.

16 Claims, 1 Drawing Sheet

U.S. PATENT DOCUMENTS

| | | | |
|---|---|---|---|
| 5,385,064 A | 1/1995 | Reece | |
| 5,497,867 A | 3/1996 | Hirsch et al. | |
| 5,560,461 A | 10/1996 | Loeffler | |
| 5,599,251 A | 2/1997 | Beim et al. | |
| 5,641,045 A | 6/1997 | Ogawa et al. | |
| 5,651,435 A | 7/1997 | Perosky et al. | |
| 5,975,263 A | 11/1999 | Forsyth | |
| 6,053,839 A | 4/2000 | Baldwin et al. | |
| 6,071,208 A | 6/2000 | Koivunen | |
| 6,083,135 A | 7/2000 | Baldwin et al. | |
| 6,217,474 B1 | 4/2001 | Ross et al. | |
| 6,354,416 B1 | 3/2002 | Eo | |
| 6,375,592 B1 | 4/2002 | Takahashi et al. | |
| 6,422,969 B1 | 7/2002 | Raghavan et al. | |
| 6,425,841 B1 | 7/2002 | Haka | |
| 6,471,615 B1 | 10/2002 | Naraki et al. | |
| 6,558,287 B2 | 5/2003 | Hayabuchi et al. | |
| 6,623,397 B1 | 9/2003 | Raghavan et al. | |
| 6,723,018 B2 * | 4/2004 | Hayabuchi et al. | 475/276 |
| 6,786,845 B1 * | 9/2004 | Haka | 475/275 |
| 6,840,885 B2 | 1/2005 | Yi et al. | |
| 7,004,881 B2 * | 2/2006 | Haka | 475/303 |
| 7,128,682 B2 * | 10/2006 | Haka | 475/275 |
| 7,384,364 B2 | 6/2008 | Jang | |
| 7,931,558 B2 * | 4/2011 | Kato et al. | 475/275 |
| 2006/0014603 A1 | 1/2006 | Raghavan et al. | |
| 2008/0207380 A1 | 8/2008 | Raghavan et al. | |
| 2010/0041507 A1 * | 2/2010 | Gumpoltsberger et al. | 475/275 |
| 2011/0207573 A1 * | 8/2011 | Kraynev et al. | 475/292 |
| 2011/0207575 A1 * | 8/2011 | Kraynev et al. | 475/297 |
| 2011/0218074 A1 * | 9/2011 | Kraynev et al. | 475/271 |
| 2012/0088625 A1 * | 4/2012 | Phillips et al. | 475/275 |

FOREIGN PATENT DOCUMENTS

| | | |
|---|---|---|
| RU | 2295457 C1 | 3/2007 |
| SU | 284545 A1 | 10/1970 |
| WO | WO2006074707 A1 | 7/2006 |

OTHER PUBLICATIONS

Hirofumi Ota, Kazutoshi, Nozaki, Atsushi Honda, Masafumi Kinoshita, Toshihiko Aoki, Minoru Todo, Mikio Iwase, "Toyota's World First 8-Speed Automatic Transmission for Passenger Cars", SAE Technical Paper Series, Apr. 16-19, 2007, 2007-01-1101, Warrendale, PA 15096-0001 USA.

* cited by examiner

| GEAR STATE | SPEED RATIO | RATIO STEP | C1 | C2 | C3 | C4 | C5 | C6 | C7 |
|---|---|---|---|---|---|---|---|---|---|
| 1ST | 3.22 | | | | X | X | X | | |
| 2ND | 2.54 | 1.27 | X | | | X | | | X |
| 3RD | 2.31 | 1.10 | | X | | X | | | X |
| 4TH | 1.75 | 1.32 | X | X | | | | | X |
| 5TH | 1.45 | 1.21 | X | | | X | | X | |
| 6TH | 1.32 | 1.10 | | X | | X | | X | |
| 7TH | 1.27 | 1.04 | X | | | X | X | | |
| 8TH | 1.20 | 1.06 | | X | | X | X | | |
| 9TH | 1.19 | 1.01 | X | | | X | | | X |
| 10TH | 1.00 | 1.19 | X | X | | | (X) | (X) | |
| 11TH | 0.95 | 1.05 | | X | X | | | | X |
| 12TH | 0.76 | 1.25 | X | | | X | X | | |
| 13TH | 0.68 | 1.12 | X | | | X | | X | |
| 14TH | 0.63 | 1.08 | | X | X | | X | | |
| 15TH | 0.55 | 1.15 | | X | X | | | X | |
| REV | -2.90 | | | | | | X | | X |

X = ENGAGED STATE

MULTI-SPEED PLANETARY TRANSMISSION WITH TWO COMPOUND PLANETARY GEAR SETS

CROSS-REFERENCE TO RELATED APPLICATION

This application claims the benefit of Russian Patent Application No. 2010107092, filed Feb. 25, 2010, which is hereby incorporated by reference in its entirety.

TECHNICAL FIELD

The invention relates to a multi-speed planetary transmission having seven torque-transmitting mechanisms and two compound planetary gear sets.

BACKGROUND OF THE INVENTION

Automotive vehicles include a powertrain that is comprised of an engine, a multi-speed transmission, and a differential or final drive. The multi-speed transmission increases the overall operating range of the vehicle by permitting the engine to operate through its torque range a number of times. The number of forward speed ratios that are available in the transmission determines the number of times the engine torque range is repeated. Early automatic transmissions had two speed ranges. This severely limited the overall speed range of the vehicle and therefore required a relatively large engine that could produce a wide speed and torque range. This resulted in the engine operating at a specific fuel consumption point during cruising other than the most efficient point. Therefore, manually-shifted (countershaft transmissions) were the most popular.

With the advent of three- and four-speed automatic transmissions, the automatic shifting (planetary gear) transmission increased in popularity with the motoring public. These transmissions improved the operating performance and fuel economy of the vehicle. The increased number of speed ratios reduces the step size between ratios and therefore improved the shift quality of the transmission by making the ratio interchanges substantially imperceptible to the operator under normal vehicle acceleration.

Multi-speed transmissions with greater than four speed ratios provide further improvements in acceleration and fuel economy over three- and four-speed transmissions. However, increased complexity, size and cost of such transmissions are competing factors which may prevent their use in some applications.

SUMMARY OF THE INVENTION

A multi-speed transmission is provided that can establish up to fifteen forward speed ratios with relatively low content and in a relatively compact layout, especially in comparison to a layshaft design providing the same number of forward speed ratios. The transmission includes an input member, an output member, and a stationary member, such as a transmission casing. The transmission further includes a first and a second compound planetary gear set. The first compound planetary gear set has a first, a second, a third, a fourth, and a fifth member. The second compound planetary gear set has a first, a second, a third, and a fourth member. In referring to the members of compound planetary gear sets in this manner, the members may be counted "first to "fourth or "first" to "fifth" in any order (i.e., top to bottom, bottom to top, etc.) The members of the planetary gear sets are sun gear members, ring gear members and carrier members.

The first member of the second compound planetary gear set is continuously connected for common rotation with the output member. An interconnecting member continuously connects the first member of the first planetary gear set for common rotation with the second member of the second planetary gear set. As used herein, "common rotation means rotation at the same speed (i.e., no relative rotation).

The transmission includes seven torque-transmitting mechanisms that are selectively engagable to interconnect respective ones of the members of the first and second compound planetary gear sets with the input member, the stationary member or respective ones of the members of the second compound planetary gear set. The seven torque-transmitting mechanisms are engagable in combinations of three to establish up to fifteen forward speed ratios and a reverse speed ratio between the input member and the output member.

The input member is selectively connectable to the second and the third members of the first compound planetary gear set via engagement of a first and a second of the seven torque-transmitting mechanisms, respectively. The fourth and the fifth members of the first compound planetary gear set are selectively grounded to the stationary member via engagement of a third and a fourth of the seven torque-transmitting mechanisms, respectively. The input member is selectively connected for common rotation with the third member of the second planetary gear set via engagement of a fifth of the seven torque-transmitting mechanisms. The second member of the second planetary gear set is selectively connected for common rotation with the third member of the second planetary gear set via engagement of a sixth of the seven torque-transmitting mechanisms. The fourth member of the second planetary gear set is grounded to the stationary member via engagement of a seventh of the seven torque-transmitting mechanisms.

The first and the second torque-transmitting mechanisms may be located axially adjacent one another with none of the planetary gear set members and none of the other torque-transmitting mechanisms therebetween. This minimizes transmission complexity and simplifies hydraulic feed to the torque-transmitting mechanisms, potentially reducing required pump capacity. Moreover, the third and the fourth torque-transmitting mechanisms may be located axially adjacent one another with none of the planetary gear set members and none of the other torque-transmitting mechanisms therebetween.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figures 1, 2:
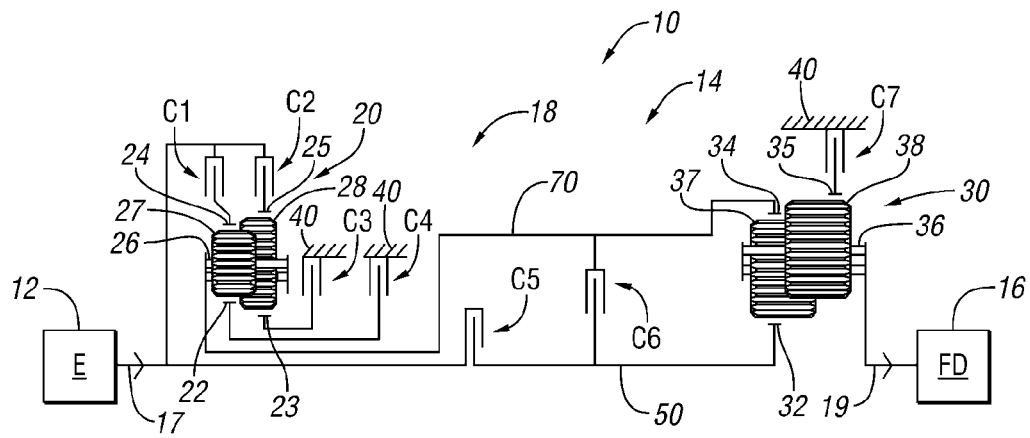
FIG. 1 is a schematic illustration in stick diagram form of a powertrain having a multi-speed planetary transmission.
FIG. 2 is a truth table depicting some of operating characteristics of the transmission shown in FIG. 1.

Referring to the drawings, wherein like reference numbers refer to like components, FIG. 1 shows the powertrain 10 with an engine 12 (labeled E), a planetary transmission 14, and a final drive mechanism 16 (labeled FD). The engine 12 may be powered by various types of fuel to improve the efficiency and fuel economy of a particular application. Such fuels may include, for example gasoline, diesel, an ethanol, dimethyl ether, etc. The planetary transmission 14 includes an input member 17 continuously connected with an output member of the engine 12, such as a crankshaft, optionally through a torque converter. The planetary transmission 14 further includes a planetary gear arrangement 18, and an output member 19 continuously connected with the final drive mechanism 16 for providing propulsion power to vehicle wheels.

The planetary gear arrangement 18 includes two compound planetary gear sets: a first compound planetary gear set 20, and a second compound planetary gear set 30. The first compound planetary gear set 20 includes two sun gear members 22, 23, two ring gear members 24, 25, and a carrier member 26 that rotatably supports first and second sets of pinion gears 27, 28. Pinion gears 27 mesh with sun gear member 22 and ring gear member 24 as well as with pinion gears 28. Pinion gears 28 mesh with sun gear member 23 and ring gear member 25. The carrier member 26 is referred to as a first member of the first compound planetary gear set 20, the ring gear member 24 and the ring gear member 25 are referred to as a second and third members, respectively, of the first compound planetary gear set 20. The sun gear member 23 and the sun gear member 22 are referred to as a fourth and fifth members, respectively of the first compound planetary gear set 20.

The second compound planetary gear set 30 includes a sun gear member 32, two ring gear members 34, 35, and a carrier member 36 that rotatably supports first and second sets of pinion gears 37, 38. The first set of pinion gears 37 meshes with sun gear member 32, with ring gear member 34, as well as with the second set of pinion gears 38. Pinion gears 38 mesh with ring gear member 35. Carrier member 26 is continuously connected for common rotation with ring gear member 34 by an interconnecting member 70. The interconnecting member 70 may be one component or multiple integrated components. The carrier member 36 is referred to as a first member of the compound planetary gear set 30. The ring gear member 34 is referred to as a second member of the compound planetary gear set 30. The sun gear member 32 is referred to as the third member of the compound planetary gear set 30. The ring gear member 35 is referred to as the fourth member of the compound planetary gear set 30.

The transmission 14 further includes seven torque-transmitting mechanisms: a first torque-transmitting mechanism C1, a second torque-transmitting mechanism C2, a third torque-transmitting mechanism C3, a fourth torque-transmitting mechanism C4, a fifth torque-transmitting mechanism C5, a sixth torque-transmitting mechanism C6, and a seventh torque-transmitting mechanism C7. Torque-transmitting mechanisms C1, C2, C5, and C6 are rotating-type clutches. Torque-transmitting mechanisms C3, C4 and C7 are stationary-type clutches, also referred to as brakes, that ground members of the compound planetary gear sets 20, 30 to a stationary member 40, such as a transmission casing. In other embodiments, various ones of the torque-transmitting mechanisms may be friction clutches, synchronizers, band clutches, selectable one-way clutches, dog clutches and other possible types of torque-transmitting mechanisms.

Only a portion of the transmission 14 above the axis of rotation established by the input member 17 is shown in FIG. 1. The planetary gear sets 20, 30 and torque-transmitting mechanisms C1, C2, C3, C4, C5, C6 and C7 are substantially symmetrical at a portion below the input member 17, not shown.

As is apparent from FIG. 1, the input member 17 is not continuously connected for rotation with any of the gear members. The output member 19 is continuously connected for common rotation with carrier member 36. Carrier member 26 is the only member of the compound planetary gear set 20 continuously connected for common rotation with any of the gear members of the compound planetary gear set 30 (i.e., with ring gear member 34).

The first torque-transmitting mechanism C1, also referred to as clutch C1, is selectively engagable to connect the input member 17 for common rotation with ring gear member 24. The second torque-transmitting mechanism C2, also referred to as clutch C2, is selectively engagable to connect the input member 17 for common rotation with the ring gear member 25. The third torque-transmitting mechanism C3, also referred to as brake C3, is selectively engagable to ground the sun gear member 23 to the stationary member 40. The fourth torque-transmitting mechanism C4, also referred to as brake C4, is selectively engagable to ground sun gear member 22 to the stationary member 40. The fifth torque-transmitting mechanism C5, also referred to as clutch C5, is selectively engagable to connect input member 17 for common rotation with sun gear member 32. The sixth torque-transmitting mechanism C6, also referred to as clutch C6, is selectively engagable to connect ring gear member 34 for common rotation with the sun gear member 32 (and also carrier member 26 for common rotation with sun gear member 32 via the interconnecting member 70). The seventh torque-transmitting mechanism C7, also referred to as brake C7, is selectively engagable to ground the ring gear member 35 to the stationary member 40. Brakes C3, C4 and C7 may be band-type brakes which are less complex and do not have the spin losses associated with friction plate-type brakes.

It is evident in FIG. 1 that clutches C1 and C2 are located axially adjacent one another with no other clutches or brakes and no members of the planetary gear sets 20, 30 between the clutches C1, C2. Locating clutches C1 and C2 adjacent one another in this manner enables hydraulic fluid flow to the clutches C1 and C2 to be through mostly common feed channels. Simplifying the hydraulic feed channels and reducing the overall length of the feed channels simplifies production of the transmission 14 and may enable a smaller pump for the hydraulic system. Likewise, brakes C3 and C4 are located axially-adjacent one another with no other torque-transmitting mechanisms or planetary gear set members therebetween.

As shown in the truth table of FIG. 2, the torque-transmitting mechanisms C1, C2, C3, C4, C5, C6 and C7 are selectively engagable in combinations of three (listed as gear states) to provide up to fifteen forward speed ratios and a reverse speed ratio. Corresponding numerical gear ratios set forth in FIG. 2 result from the following gear tooth counts for the first compound planetary gear set 20 that provide: a gear ratio of ring gear member 24 to sun gear member 22 of −3.14 with carrier member 26 stopped (for purposes of calculation only); a gear ratio of the ring gear member 25 to the sun gear member 23 with carrier member 26 stopped (for purposes of calculation only) of −2.2; a gear ratio of the ring gear member 34 to the sun gear member 32 with carrier member 26 stopped (for purposes of calculation only) is −2.2; and a gear ratio of the ring gear member 35 to the sun gear member 32 is 3.9 with the carrier member 36 stopped (for purposes of calculation only).

Thus, there are nine underdrive speed ratios (1st to 9th), a direct drive (10th) and five overdrive speed ratios (11th and 15th). With the gear ratios listed above, the ratio steps listed in FIG. 2 are achieved. As is apparent in FIG. 2, the ratio steps are very even in the forward speed ratios, resulting in smooth shift feel and increased fuel efficiency as the engine 12 need only operate over a narrow range of speeds in each speed ratio.

Other gear tooth counts and corresponding gear ratios may be selected to accomplish speed ratios and ratio steps advantageous to the particular transmission application. A person of ordinary skill in the art of transmission design would understand how to select desirable tooth counts.

To establish the reverse speed ratio, clutch C5 and brake C7 are engaged. Torque is carried from the input member 17 through engaged clutch C5 and along an intermediate shaft 50 to sun gear member 32 and through second compound planetary gear set 30 to the carrier member 36 and the output member 19. The output member 19 rotates in an opposite direction from the input member 17.

To establish the first speed ratio, brakes C3 and C4 and clutch C5 are engaged. Because two gear members of compound planetary gear set 20 are grounded, the entire planetary gear set 20 is stationary, and only planetary gear set 30 is active to affect the speed ratio. Ring gear member 34 is stationary because carrier member 26 is stationary. Torque is carried from the input member 17 to the intermediate shaft 50 as in the reverse speed ratio, and is carried through compound planetary gear set 30 to carrier member 36 and output member 19 via the stopped ring gear 34. Input member 17 and output member 19 rotate in the same direction, as in all of the forward speed ratios.

In a second forward speed ratio, clutch C1 and brakes C3 and C7 are engaged. Torque is carried from input member 17 through compound planetary gear set 20 along interconnecting member 70 to compound planetary gear set 30 to carrier member and output member 19. Thus, gear ratios through both the first and the second compound planetary gear sets 20, 30 affect the speed ratio between the input member 17 and the output member 19. The shift from the first forward speed ratio to the second forward speed ratio is a double-transition shift, in that two different torque-transmitting mechanisms are engaged in the second forward speed ratio than in the first forward speed ratio.

In a third forward speed ratio, clutch C2 and brakes C4 and C7 are engaged. Torque is carried from input member 17 through compound planetary gear set 20 along interconnecting member 70 to compound planetary gear set 30 to carrier member 36 and output member 19. Thus, gear ratios through both of the first and the second compound planetary gear sets 20, 30 affect the speed ratio between the input member 17 and the output member 19. A different speed ratio is established through the first compound planetary gear set than in the second forward speed ratio because clutch C2 and brake C4 are engaged rather than clutch C1 and brake C3. The speed ratio established through the second compound planetary gear set 30 is the same as in the second forward speed ratio. The shift from the second forward speed ratio to the third forward speed ratio is a double-transition shift, in that two different torque-transmitting mechanisms are engaged in the third forward speed ratio than in the second forward speed ratio.

In a fourth forward speed ratio, clutches C1 and C2 and brake C7 are engaged. Torque is carried from input member 17 through compound planetary gear set 20 along interconnecting member 70 to compound planetary gear set 30 to carrier member and output member 19. Because the two ring gear members 24, 25 of planetary gear set 20 rotate at the same speed, all components of planetary gear set 20 rotate at the same speed. Thus, a gear ratio through the second compound planetary gear set 30 affects the speed ratio between the input member 17 and the output member 19. A different speed ratio is established through the first compound planetary gear set than in the second or the third forward speed ratio because clutches C1 and C2 are engaged and neither brake C3 nor brake C4 is engaged. The speed ratio established through the second compound planetary gear set 30 is the same as in the second and third forward speed ratios. The shift from the third forward speed ratio to the fourth forward speed ratio is a single-transition shift, in that only one different torque-transmitting mechanism is engaged in the fourth forward speed ratio than in the third forward speed ratio.

In a fifth forward speed ratio, clutches C1 and C6 and brake C3 are engaged. Torque is carried from input member 17 through first compound planetary gear set 20 along interconnecting member 70 to second compound planetary gear set 30 to carrier member 36 and output member 19. Because clutch C6 connects ring gear member 34 for common rotation with sun gear member 32, all components of the compound planetary gear set 30 rotate in unison and tooth counts or gear ratios of second compound planetary gear set 30 have no affect on the speed of output member 19. Thus, only the gear ratio through the first compound planetary gear set 20 affects the speed ratio between the input member 17 and the output member 19. The shift from the fourth forward speed ratio to the fifth forward speed ratio is a double-transition shift, in that two different torque-transmitting mechanisms are engaged in the fifth forward speed ratio than in the fourth forward speed ratio.

In a sixth forward speed ratio, clutches C2 and C6 and brake C4 are engaged. Torque is carried from input member 17 through first compound planetary gear set 20 along interconnecting member 70 to second compound planetary gear set 30 to carrier member 36 and output member 19. Because clutch C6 connects ring gear member 34 for common rotation with sun gear member 32, all components of the second compound planetary gear set 30 rotate in unison and tooth counts or gear ratios of second compound planetary gear set 30 have no affect on the speed ratio of the input member 17 to the output member 19. Thus, only the gear ratio through the first compound planetary gear set 20 affects the speed ratio between the input member 17 and the output member 19. A different speed ratio is established through the first compound planetary gear set 20 than in the fifth forward speed ratio because clutch C2 and brake C4 are engaged rather than clutch C1 and brake C3. The shift from the fifth forward speed ratio to the sixth forward speed ratio is a double-transition shift, in that two different torque-transmitting mechanisms are engaged in the sixth forward speed ratio than in the fifth forward speed ratio.

In a seventh forward speed ratio, clutches C1 and C5 and brake C3 are engaged. Torque is carried from input member 17 through compound planetary gear set 20 along interconnecting member 70 to ring gear member 34 of compound planetary gear set 30. Torque is also carried from input member 17 along intermediate member 50 to sun gear member 32. Thus, torque at ring gear member 34 and torque at sun gear member 32 is summed through the compound planetary gear set 30 to output member 19. Thus, the gear ratios through both the first compound planetary gear set 20 and the second compound planetary gear set 30 affect the speed ratio between the input member 17 and the output member 19, with torque input at both ring gear member 34 and sun gear member 32 to the second compound planetary gear set 30. A different speed ratio is established through the first compound planetary gear set 20 than in the sixth forward speed ratio because clutch C1 and brake C3 are engaged rather than clutch C2 and brake C4. The second compound planetary gear set 30 also affects the speed ratio between input member 17 and output member 19, unlike in the sixth forward speed ratio in which the components of the second compound planetary gear set 30 rotate in unison. The shift from the sixth forward speed ratio to the seventh forward speed ratio is a triple-transition shift, in that all three torque-transmitting mechanisms engaged in the seventh forward speed ratio are different than in the sixth forward speed ratio. Preferably, the transmission 14 will be operated at less than all fifteen available forward speed ratios and a shift will be from the sixth to the eighth forward speed ratio, which is only a single transition shift.

In an eighth forward speed ratio, clutches C2 and C5 and brake C4 are engaged. Torque is carried from input member 17 through compound planetary gear set 20 along interconnecting member 70 to ring gear member 34 of compound planetary gear set 30. Torque is also carried from input member 17 along intermediate member 50 to sun gear member 32. Thus, torque at ring gear member 34 and torque at sun gear member 32 is summed through the compound planetary gear set 30 to output member 19. Thus, the gear ratios through both the first compound planetary gear set 20 and the second compound planetary gear set 30 affect the speed ratio between the input member 17 and the output member 19, with torque input at both ring gear member 34 and sun gear member 32 to the second compound planetary gear set 30. A different speed ratio is established through the first compound planetary gear set 20 than in the seventh forward speed ratio because clutch C2 and brake C4 are engaged rather than clutch C1 and brake C3. The shift from the seventh forward speed ratio to the eighth forward speed ratio is a double-transition shift. If the transmission 14 is operated with less than all fifteen available forward speed ratios and a shift is made from the sixth to the eighth forward speed ratio, the shift would be only a single transition shift.

In a ninth forward speed ratio, clutch C1 and brakes C4 and C7 are engaged. Torque is carried from input member 17 through compound planetary gear set 20 along interconnecting member 70 to compound planetary gear set 30 to carrier member 36 and output member 19. Thus, gear ratios through both the first and the second compound planetary gear sets 20, 30 affect the speed ratio between the input member 17 and the output member 19. A different speed ratio is established through the first compound planetary gear set 20 than in the eighth forward speed ratio because clutches C1 and brake C4 are engaged rather than clutch C2 and brake C4. The shift from the eighth forward speed ratio to the ninth forward speed ratio is a double-transition shift. However, because the eighth and ninth forward speed ratios are very close numerically, the transmission may optionally be operated with only one of these forward speed ratios.

The tenth forward speed ratio is a direct drive ratio (i.e., where speed of the input member 17 is the same as the speed of the output member 19, with ratios of the compound planetary gear sets 20, 30 having no affect. The tenth forward speed ratio is established by engagement of clutches C1 and C2 and either one of clutches C5 and C6. In FIG. 2, engagement of clutches C5 and C6 is indicated as being in the alternative by the bracketed X. Because both clutches C1 and C2 are engaged, the speed of the input member 17 is transmitted to both the ring gear members 24 and 25, causing all components of compound planetary gear set 20 to rotate at the same speed. The speed of the input member 17 is fed to the ring gear member 34 along interconnecting member 70 and to sun gear member 32 either by engagement of clutch C5 or by engagement of clutch C6. Thus, all components of the compound planetary gear sets 20, 30 rotate at the same speed, and the speed of the output member 19 is the same as the speed of the input member 17.

In an eleventh forward speed ratio, clutch C2 and brakes C3 and C7 are engaged. Torque is carried from input member 17 through compound planetary gear set 20 along interconnecting member 70 to compound planetary gear set 30 to carrier member 36 and output member 19. Thus, gear ratios through both the first and the second compound planetary gear sets 20, 30 affect the speed ratio between the input member 17 and the output member 19. The shift from the tenth forward speed ratio to the eleventh forward speed ratio is a double-transition shift. However, because the tenth and eleventh forward speed ratios are very close numerically, the transmission may be operated with only one of these forward speed ratios.

In a twelfth forward speed ratio, clutches C1 and C5 and brake C4 are engaged. Torque is carried from input member 17 through compound planetary gear set 20 along interconnecting member 70 to ring gear member 34 of compound planetary gear set 30. Torque is also carried from input member 17 along intermediate member 50 to sun gear member 32. Thus, torque at ring gear member 34 and torque at sun gear member 32 is summed through the compound planetary gear set 30 to output member 19. Thus, the gear ratios through both the first compound planetary gear set 20 and the second compound planetary gear set 30 affect the speed ratio between the input member 17 and the output member 19, with torque input at both ring gear member 34 and sun gear member 32 to the second compound planetary gear set 30. The shift from the eleventh forward speed ratio to the twelfth forward speed ratio is a triple-transition shift. If the transmission 14 is operated with less than all fifteen available forward speed ratios (e.g., without the eleventh forward speed ratio as it is close in numerical value to tenth forward speed ratio), and a shift is made from the tenth to the twelfth forward speed ratio, it is only a single transition shift.

In a thirteenth forward speed ratio, clutches C1 and C6 and brake C4 are engaged. Torque is carried from input member 17 through first compound planetary gear set 20 along interconnecting member 70 to second compound planetary gear set 30 to carrier member 36 and output member 19. Because clutch C6 connects ring gear member 34 for common rotation with sun gear member 32, all components of the second compound planetary gear set 30 rotate in unison and tooth counts or gear ratios of second compound planetary gear set 30 have no affect on the speed of output member 19. Thus, only the gear ratio through the first compound planetary gear set 20 affects the speed ratio between the input member 17 and the output member 19. The shift from the twelfth forward speed ratio to the thirteenth forward speed ratio is a single-transition shift, in that only one different torque-transmitting mechanism is engaged in the thirteenth forward speed ratio than in the twelfth forward speed ratio.

In a fourteenth forward speed ratio, clutches C2 and C5 and brake C3 are engaged. Torque is carried from input member 17 through first compound planetary gear set 20 along interconnecting member 70 to ring gear member 34 of second compound planetary gear set 30. Torque is also carried from input member 17 along intermediate member 50 to sun gear member 32. Thus, torque at ring gear member 34 and torque at sun gear member 32 is summed through the second compound planetary gear set 30 to output member 19. Thus, the gear ratios through both the first compound planetary gear set 20 and the second compound planetary gear set 30 affect the speed ratio between the input member 17 and the output member 19, with torque input at both ring gear member 34 and sun gear member 32 to the second compound planetary gear set 30. The shift from the thirteenth forward speed ratio to the fourteenth forward speed ratio is a triple-transition shift. If the transmission 14 is operated with less than all fifteen available forward speed ratios, i.e., without the thirteenth forward speed ratio as it is close in numerical value to the fourteenth forward speed ratio, and a shift is made from the twelfth to the fourteenth forward speed ratio, it would be a double transition shift, or if from the eleventh to the fourteenth forward speed ratio, it would be only a single transmission shift.

In a fifteenth forward speed ratio, clutches C2 and C6 and brake C3 are engaged. Torque is carried from input member 17 through first compound planetary gear set 20 along interconnecting member 70 to second compound planetary gear set 30 to carrier member 36 and output member 19. Because clutch C6 connects ring gear member 34 for common rotation with sun gear member 32, all components of the second compound planetary gear set 30 rotate in unison and tooth counts or gear ratios of second compound planetary gear set 30 have no affect on the speed of output member 19. Thus, only the gear ratio through the first compound planetary gear set 20 affects the speed ratio between the input member 17 and the output member 19. The shift from the fourteenth forward speed ratio to the fifteenth forward speed ratio is a single-transition shift, in that only one different torque-transmitting mechanism is engaged in the fifteenth forward speed ratio than in the fourteenth forward speed ratio.

As set forth above, by engaging the torque-transmitting mechanisms C1, C2, C3, C4, C5, C6 and C7 in different combinations, there are fifteen available forward speed ratios and one reverse speed ratio. The forward speed ratios may be grouped according to their establishment of one of four different operating modes of the transmission 14. A first operating mode, in which the first compound planetary gear set 20 has no effect on the numerical speed ratio between the input member 17 an output member 19 is established by the torque transmitting mechanism engagements of the first forward speed ratio described above. Because all components of the first compound planetary gear set 20 rotate at the same speed, only the gear ratio through the second compound planetary gear set 30 affects the first forward speed ratio.

A second operating mode, in which all torque flows through the first compound planetary gear set 20 prior to flowing through the second compound planetary gear set 30, is established by the torque transmitting mechanism engagements of the second, third, fourth, ninth, and eleventh forward speed ratios described above. In these speed ratios of second operating mode, torque is supplied to the second compound planetary gear set 30 from the first compound planetary gear set 20 at only one input, the ring gear member 34.

A third operating mode, in which a gear ratio through only the first compound planetary gear set 20 affects the speed ratio between input member 17 and the output member 19 is established by the torque transmitting mechanism engagements of the fifth, sixth, one of the alternative tenth, thirteenth, and fifteenth forward speed ratios described above. In the third operating mode, all components of the second compound planetary gear set 30 rotate at the same speed because of engagement of clutch C6, and therefore the gear ratios of the second compound planetary gear set have no effect on the forward speed ratio between input member 17 and output member 19.

A fourth operating mode, in which torque flows to the second compound planetary gear set 30 along two different flow paths, is established by the torque transmitting mechanism engagements of the seventh, eighth, one of the alternative 10th, 12th, and 14th forward speed ratios described above. In the fourth operating mode, torque is supplied from the first compound planetary gear set 20 to the second compound planetary gear set 30 at two inputs, the ring gear member 34 and the sun gear member 32, and the speed of these components are summed through the second planetary gear set 30.

Although fifteen forward speed ratios are available, because many of the numerical speed ratios of the first through fifteenth forward speed ratios are close in value, the transmission 14 optionally may be operated as a six-speed transmission, a seven-speed transmission, a nine-speed transmission, or any other combination of forward speed ratios less than fifteen total, such as an eleven-speed transmission. For example, to operate the transmission 14 as a six-speed transmission, an algorithm stored in a controller that controls the valves to control hydraulic fluid flow to torque transmitting mechanisms may establish only the reverse speed ratio, and the third, sixth, eighth, one of the alternative tenth, fourteenth, and fifteenth forward speed ratios described above as first, second, third, fourth, fifth, and sixth forward speed ratios. In such a six-speed transmission, there would be no double transition shifts between subsequent forward speed ratios.

To operate the transmission 14 as a seven-speed transmission, the six forward speed ratios described above for the six-speed transmission would be utilized, as well as the fourth forward speed ratio of FIG. 2. In such a seven-speed transmission, there would be only one double-transition shift, between the second and the third forward speed ratios, (i.e., between the fourth and sixth forward speed ratios described above).

To operate the transmission 14 as an eight-speed transmission, the seven forward speed ratios described with respect to seven-speed transmission would be utilized, as well as the thirteenth forward speed ratio of FIG. 2. In such an eight-speed transmission, there would be two double-transition shifts, between the third and fourth forward speed ratios, (i.e., between the fourth and sixth forward speed ratios described above), as well as between the sixth and seventh speed ratios (i.e., between the thirteenth and fourteenth forward speed ratios of FIG. 2).

To operate the transmission 14 as an eleven-speed transmission, the eight forward speed ratios described with respect to the eight-speed transmission would be utilized, as well as any three of the five other possible forward speed ratios. Preferably, the other three speed ratios would be the first, second and fifth speed ratios of FIG. 2. The selection of which speed ratios to utilize would be based on which of the ratio steps is most desirable for a particular application of the powertrain 10. In such an eleven-speed transmission, there would be five double-transition shifts. The transmission 14 could also be operated with less than six forward speed ratios, with nine forward speed ratios, with ten forward speed ratios, with eleven forward speed ratios, with twelve forward speed ratios, with thirteen forward speed ratios, or with fourteen forward speed ratios.

The powertrain 10 may share components with a hybrid vehicle, and such a combination may be operable in a "charge-depleting mode". For purposes of the present invention, a "charge-depleting mode" is a mode wherein the vehicle is powered primarily by an electric motor/generator such that a battery is depleted or nearly depleted when the vehicle reaches its destination. In other words, during the charge-depleting mode, the engine 12 is only operated to the extent necessary to ensure that the battery is not depleted before the destination is reached. A conventional hybrid vehicle operates in a "charge-sustaining mode", wherein if the battery charge level drops below a predetermined level (e.g., 25%) the engine is automatically run to recharge the battery. Therefore, by operating in a charge-depleting mode, the hybrid vehicle can conserve some or all of the fuel that would otherwise be expended to maintain the 25% battery charge level in a conventional hybrid vehicle. It should be appreciated that a hybrid vehicle powertrain is preferably only operated in the charge-depleting mode if the battery can be recharged after the destination is reached by plugging it into an energy source.

While the best modes for carrying out the invention have been described in detail, those familiar with the art to which this invention relates will recognize various alternative designs and embodiments for practicing the invention within the scope of the appended claims.

The invention claimed is:

1. A multi-speed transmission comprising:
    an input member;
    an output member;
    a stationary member;
    a first and a second compound planetary gear set; wherein the first compound planetary gear set has a first, a second, a third, a fourth, and a fifth member; wherein the second compound planetary gear set has a first, a second, a third, and a fourth member; wherein the members of the planetary gear sets are sun gear members, ring gear members and carrier members; wherein the first member of the second compound planetary gear set is continuously connected for common rotation with the output member;
    an interconnecting member continuously connecting the first member of the first planetary gear set for common rotation with the second member of the second planetary gear set; and
    seven torque-transmitting mechanisms selectively engagable to interconnect respective ones of the members of the first and the second compo and planetary gear sets with the input member, the stationary member or respective ones of the members of the second compound planetary gear set, the seven torque-transmitting mechanisms being engagable in combinations of three to establish up to fifteen forward speed ratios and a reverse speed ratio between the input member and the output member.

2. The multi-speed transmission of claim 1, wherein the input member is selectively connectable to the second and the third members of the first compound planetary gear set via engagement of a first and a second of the seven torque-transmitting mechanisms, respectively.

3. The multi-speed transmission of claim 2, wherein the first and the second torque-transmitting mechanisms are located axially adjacent one another with none of the planetary gear set members and none of the other torque-transmitting mechanisms therebetween.

4. The multi-speed transmission of claim 1, wherein the fourth and the fifth members of the first compound planetary gear set are selectively grounded to the stationary member via engagement of a third and a fourth of the seven torque-transmitting mechanisms, respectively.

5. The multi-speed transmission of claim 4, wherein the third and the fourth torque-transmitting mechanisms are located axially adjacent one another with none of the planetary gear set members and none of the other torque-transmitting mechanisms therebetween.

6. The multi-speed transmission of claim 1, wherein the input member is selectively connected for common rotation with the third member of the second planetary gear set via engagement of a fifth of the seven torque-transmitting mechanisms.

7. The multi-speed transmission of claim 1, wherein the second member of the second planetary gear set is selectively connected for common rotation with the third member of the second planetary gear set via engagement of a sixth of the seven torque-transmitting mechanisms.

8. The multi-speed transmission of claim 1, wherein the fourth member of the second planetary gear set is grounded to the stationary member via engagement of a seventh of the seven torque-transmitting mechanisms.

9. The multi-speed transmission of claim 1, wherein three of the seven torque-transmitting mechanisms are band-type brakes which are selectively engagable to connect different respective members of the compound planetary gear sets to the stationary member.

10. The multi-speed transmission of claim 1, wherein the first, the second, the third, the fourth, and the fifth members of the first compound planetary gear set are a first carrier member, a first ring gear member, a second ring gear member, a first sun gear member and a second sun gear member, respectively; wherein the first carrier member rotatably supports first and second sets of pinion gears that mesh with one another; wherein the first set of pinion gears meshes with the first ring gear member and the second sun gear member; wherein the second set of pinion gears meshes with the second ring gear member and the first sun gear member;
    wherein the first, the second, the third, and the fourth members of the second compound planetary gear set are a second carrier member, a third ring gear member, a third sun gear member, and a fourth ring gear member, respectively; wherein the second carrier member rotatably supports a third and a fourth set of pinion gears; wherein the third set of pinion gears meshes with the third ring gear member and the third sun gear member; and wherein the fourth set of pinion gears meshes the third set of pinion gears and the fourth ring gear member.

11. The multi-speed transmission of claim 1, wherein the input member is selectively connectable to the second and the third members of the first compound planetary gear set via engagement of a first and a second of the seven torque-transmitting mechanisms, respectively;
    wherein the fourth and the fifth members of the first compound planetary gear set are selectively grounded to the stationary member via engagement of a third and a fourth of the seven torque-transmitting mechanisms, respectively;
    wherein the input member is selectively connected for common rotation with the third member of the second planetary gear set via engagement of a fifth of the seven torque-transmitting mechanisms;
    wherein the second member of the second planetary gear set is selectively connected for common rotation with the third member of the second planetary gear set via engagement of a sixth of the seven torque-transmitting mechanisms; and
    wherein the fourth member of the second planetary gear set is grounded to the stationary member via engagement of a seventh of the seven torque-transmitting mechanisms.

12. The multi-speed transmission of claim 11, wherein one of the up to fifteen forward speed ratios is determined only by the second compound planetary gear set when only the third, the fourth, and the fifth torque-transmitting mechanisms are engaged.

13. The multi-speed transmission of claim 11, wherein one of the up to fifteen forward speed ratios is established by torque flow from the first compound planetary gear set to the second compound planetary gear set when the seventh torque-transmitting mechanism is engaged and either one of the first and the second torque-transmitting mechanisms and one of the third and the fourth torque-transmitting mechanism or both of the first and the second torque-transmitting mechanisms are engaged.

14. The multi-speed transmission of claim 11, wherein one of the up to fifteen forward speed ratios is established by only the first compound planetary gear set when the sixth torque-transmitting mechanism is engaged and either one of the first and the second torque-transmitting mechanisms and one of the third and the fourth torque-transmitting mechanisms or both of the first and the second torque-transmitting mechanisms are engaged.

15. The multi-speed transmission of claim 11, wherein one of the up to fifteen forward speed ratios is established by both of the compound planetary gear sets with rotational speed summation at the second compound planetary gear set when the fifth torque-transmitting mechanism is engaged and either one of the first and the second torque-transmitting mechanisms and one of the third and the fourth torque-transmitting mechanisms or both of the first and the second torque-transmitting mechanisms are engaged.

16. A multi-speed transmission comprising:
an input member;
an output member;
a stationary member;
a first and a second compound planetary gear set; wherein the first compound planetary gear set has a first, a second, a third, a fourth, and a fifth member; wherein the second compound planetary gear set has a first, a second, a third, and a fourth member; wherein the members of the planetary gear sets are sun gear members, ring gear members and carrier members; wherein the first member of the second compound planetary gear set is continuously connected for common rotation with the output member;
an interconnecting member continuously connecting the first member of the first planetary gear set for common rotation with the second member of the second planetary gear set;
seven selectively engagable torque-transmitting mechanisms;
wherein the input member is selectively connectable to the second and the third members of the first compound planetary gear set via engagement of a first and a second of the seven torque-transmitting mechanisms, respectively;
wherein the fourth and the fifth members of the first compound planetary gear set are selectively grounded to the stationary member via engagement of a third and a fourth of the seven torque-transmitting mechanisms, respectively;
wherein the input member is selectively connected for common rotation with the third member of the second planetary gear set via engagement of a fifth of the seven torque-transmitting mechanisms;
wherein the second member of the second planetary gear set is selectively connected for common rotation with the third member of the second planetary gear set via engagement of a sixth of the seven torque-transmitting mechanisms; and
wherein the fourth member of the second planetary gear set is grounded to the stationary member via engagement of a seventh of the seven torque-transmitting mechanisms, the seven torque-transmitting mechanisms being engagable in combinations of three to establish up to fifteen forward speed ratios and a reverse speed ratio between the input member and the output member.

* * * * *